US012229406B2

(12) United States Patent
Pohlmann et al.

(10) Patent No.: US 12,229,406 B2
(45) Date of Patent: Feb. 18, 2025

(54) SPEED BINS TO SUPPORT MEMORY COMPATIBILITY

(71) Applicant: Micron Technology, Inc., Boise, ID (US)

(72) Inventors: Eric V. Pohlmann, Boise, ID (US); Neal J. Koyle, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/390,820

(22) Filed: Dec. 20, 2023

(65) Prior Publication Data

US 2024/0126434 A1 Apr. 18, 2024

Related U.S. Application Data

(63) Continuation of application No. 17/585,253, filed on Jan. 26, 2022, now Pat. No. 11,886,702.

(60) Provisional application No. 63/145,296, filed on Feb. 3, 2021.

(51) Int. Cl.
*G06F 3/06* (2006.01)
(52) U.S. Cl.
CPC .......... *G06F 3/0607* (2013.01); *G06F 3/0655* (2013.01); *G06F 3/0683* (2013.01)
(58) Field of Classification Search
CPC .... G06F 3/0634; G06F 3/0655; G06F 3/0661; G06F 3/0683; G06F 3/0688
See application file for complete search history.

(56) References Cited

U.S. PATENT DOCUMENTS

| | | | |
|---|---|---|---|
| 2018/0321845 | A1 | 11/2018 | Mutnury et al. |
| 2019/0121546 | A1 | 4/2019 | La Fratta et al. |
| 2020/0097418 | A1 | 3/2020 | Lendvay |
| 2020/0226044 | A1 | 7/2020 | Shim |

FOREIGN PATENT DOCUMENTS

KR 10-2015-0012518 A 2/2015

OTHER PUBLICATIONS

"International Search Report and Written Opinion of the International Searching Authority," issued in connection with Int'l Appl. No. PCT/US2022/070388, dated May 12, 2022 (9 pages).

*Primary Examiner* — Yong J Choe
(74) *Attorney, Agent, or Firm* — Holland & Hart LLP

(57) ABSTRACT

Methods, systems, and devices for speed bins to support memory compatibility are described. A host device may read a value of a register including serial presence detect data of a memory module. The serial presence detect data may be indicative of a timing constraint for operating the memory module at a first clock rate, where the timing constraint and the first clock rate may be associated with a first speed bin. The host device may select, for communication with the memory module, a second speed bin associated with a second clock rate at the host device and the timing constraint, where the host device may support operations according to a set of timing constraints that includes a set of values. The timing constraint may be selected from a subset of the set of timing constraints, where the subset may be exclusive of at least one of the set of values.

20 Claims, 8 Drawing Sheets

| | | | Memory Module | | | | | | | | | | | | | | | | |
|---|---|---|---|---|---|---|---|---|---|---|---|---|---|---|---|---|---|---|---|
| | | Data Rate | 6400 | | 6000 | | 5600 | | 5200 | | 4800 | | 4400 | | 4000 | | 3600 | | 3200 | |
| | Data Rate | Speed Bin | B | C | B | C | B | C | B | C | B | C | B | C | B | C | B | C | B | C |
| Host Device | 2100 | | X | X | X | X | X | X | X | X | X | X | X | X | X | X | X | X | X | X |
| | 3200 | Dump | | | X | X | X | X | X | X | X | | X | | X | X | X | X | X | X |
| | | C | | | X | [X] | X | [X] | X | [X] | X | [X] | X | [X] | X | [X] | X | [X] | X | X |
| | | B | | | X | | X | | [X] | | X | | X | | [X] | | [X] | | X | |
| | 3600 | Dump | | | X | X | X | X | X | | | | | | X | | X | X | | |
| | | C | | | X | X | X | [X] | X | [X] | | | X | | X | [X] | X | [X] | X | X |
| | | B | | | X | | X | | X | | | | X | | X | | X | | X | |
| | 4000 | Dump | | | | | X | X | X | X | X | X | | | X | | X | X | | |
| | | C | | | X | X | X | X | X | X | X | X | | | X | | X | X | | |
| | | B | [X] | | X | | [X] | | X | | [X] | | X | | | | X | | | |
| | 4400 | Dump | | | | | | | | | | | | | | | X | X | | |
| | | C | | | | | X | X | X | X | X | X | X | | X | X | | | | |
| | | B | | | | | X | | [X] | | X | | [X] | | X | | | | | |
| | 4800 | Dump | | | X | X | X | X | X | X | | | | | X | | | | | |
| | | C | | | X | X | X | [X] | X | [X] | X | [X] | X | | X | | | | | |
| | | B | | | X | | X | | X | | | | | | | | | | | |
| | 5200 | Dump | | | X | X | X | X | X | X | | | | | | | | | | |
| | | C | | | X | X | X | [X] | X | [X] | X | X | | | | | | | | |
| | | B | [X] | | X | | [X] | | X | | | | | | | | | | | |
| | 5600 | Dump | | | X | X | X | X | | | | | | | | | | | | |
| | | C | | | X | X | X | [X] | X | X | | | | | | | | | | |
| | | B | | | X | | X | | | | | | | | | | | | | |
| | 6000 | Dump | | | X | X | X | X | | | | | | | | | | | | |
| | | C | | | X | X | X | X | | | | | | | | | | | | |
| | | B | [X] | | X | | | | | | | | | | | | | | | |
| | 6400 | Dump | | | X | X | | | | | | | | | | | | | | |
| | | C | | | X | X | | | | | | | | | | | | | | |
| | | B | X | | | | | | | | | | | | | | | | | |

☐ 205 Unsupported Configuration
☒ 210 Supported Configuration (X)
▣ 215 Optionally Supported Configuration

FIG. 2

SPEED BINS TO SUPPORT MEMORY COMPATIBILITY

CROSS REFERENCE

The present Application for patent is a continuation of U.S. patent application Ser. No. 17/585,253 by Pohlmann et al., entitled "SPEED BINS TO SUPPORT MEMORY COMPATIBILITY", filed Jan. 26, 2022, which claims priority to U.S. Provisional Patent Application No. 63/145,296 by Pohlmann et al., entitled "SPEED BINS TO SUPPORT MEMORY COMPATIBILITY", filed Feb. 3, 2021, each of which is assigned to the assignee hereof and is expressly incorporated by reference in its entirety herein.

FIELD OF TECHNOLOGY

The following relates generally to one or more systems for memory and more specifically to speed bins to support memory compatibility.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

BRIEF DESCRIPTION OF THE DRAWINGS

FIG. 2 illustrates an example of a downclocking scheme that supports speed bins to support memory compatibility in accordance with examples as disclosed herein.

DETAILED DESCRIPTION

Figure 1:
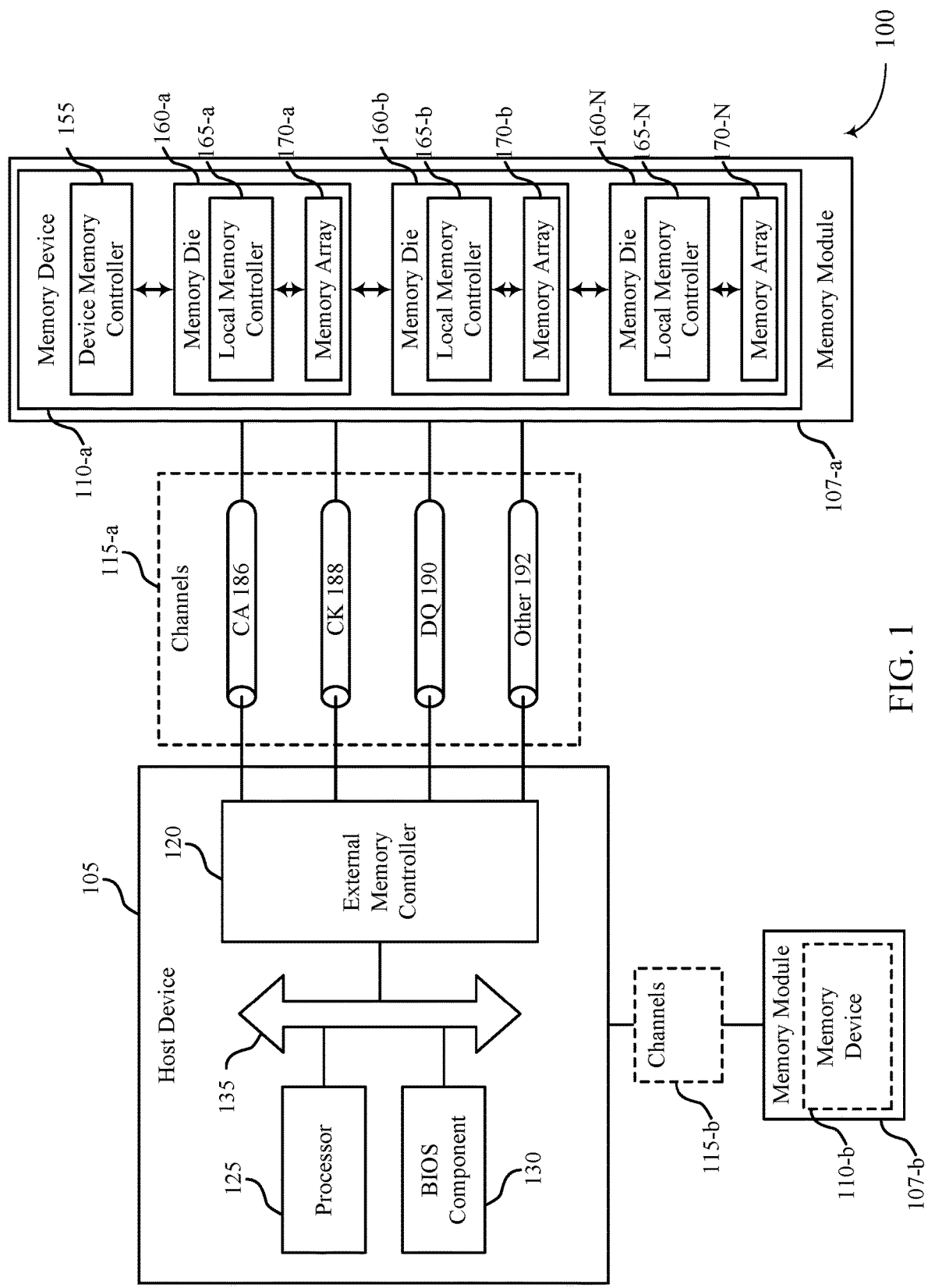
FIG. 1 illustrates an example of a system that supports speed bins to support memory compatibility in accordance with examples as disclosed herein.

A host device may be configured to support a set of speed bins, where each supported speed bin may be related to one or more timings that may be associated with a respective clock rate, a respective data rate, or both. The timings of the speed bins may include a respective timing constraint in some examples (e.g., an array access delay, a row precharge delay, a row address to column address delay). When a host device is coupled with the memory module, the memory module may indicate (e.g., via a register that includes serial presence detect (SPD) data) one or both of a clock rate (e.g., a maximum clock rate) or a timing constraint which the memory module supports. In some examples, the host device may adjust a clock rate of the host device to a different clock rate based on the clock rate and the timing constraint supported by the memory module (e.g., a lower clock rate, which may be referred to as downclocking). When the host device downclocks to the lower clock rate, the host device may select a speed bin from the set of supported speed bins that is compatible with the clock rate and/or timing constraint indicated by the memory module. Upon selecting the compatible speed bin, the host device may operate according to a timing constraint associated with the compatible speed bin.

In some examples, the host device may be coupled with two memory modules, among other examples, that may each be associated with different supported clock rates (e.g., different maximum support clock rates) or different values of timing constraints or both.

When performing downclocking in some such examples using other different techniques, however, the host device may fail to support a speed bin that is compatible with both two memory modules for at least one clock rate at the host device. For instance, the speed bins associated with a given value of a timing constraint (e.g., 20 nanoseconds) may not support communications with two memory modules for each possible combination of supported clock rates, timing constraints, or both for the two memory modules. As such, using these other different techniques, the host device may be incapable of communicating with both memory modules simultaneously in at least some instances.

In contrast and related to the techniques of the present disclosure, to enable the host device to support concurrent (e.g., at least partially overlapping) or simultaneous communication with two or more memory modules, speed bins associated with the given value of the timing constraint (e.g., 20 nanoseconds) may be excluded from the set of speed bins among which the host device selects. Additionally or alternatively, at least one speed bin associated with a clock rate (e.g., each clock rate) supported by the host device may be compatible with each supported clock rate of the memory modules equal to or higher than the clock rate associated with the speed bin. As such, the host device may ensure that there is at least one speed bin compatible with multiple memory modules when downclocking to a given clock rate, a given data rate, or both.

Features of the disclosure are initially described in the context of systems as described with reference to FIG. 1. Features of the disclosure are described in the context of downclocking schemes and a process flow as described with reference to FIGS. 2-4. These and other features of the disclosure are further illustrated by and described with reference to an apparatus diagram and flowcharts that relate to speed bins to support memory compatibility as described with reference to FIGS. 5-8.

FIG. 1 illustrates an example of a system 100 that supports speed bins to support memory compatibility in accordance with examples as disclosed herein. The system 100 may include a host device 105, memory modules 107-a and 107-b, memory devices 110-a and 110-b, and a plurality of channels 115-a and 115-b coupling the host device 105 with memory modules 107-a and 107-b, respectively. The system 100 may include one or more memory devices 110, but aspects of the one or more memory devices 110 may be described in the context of a single memory device (e.g., memory device 110). In some examples, one or more memory modules 107 may include or may otherwise be coupled with one or more memory devices 110.

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

Each memory module 107 may include one or more respective memory devices 110 in some examples. For instance, memory module 107-a may include memory device 110-a and memory module 107-b may include memory device 110-b. In some examples, memory modules 107-a and 107-b may include additional memory devices. In some examples, each memory module may be an example of a dual in-line memory module (DIMM). Additionally or alternatively, each memory module 107 may be coupled with, but not include one or more respective memory devices 110 in some examples.

A memory device 110 (e.g., memory device 110-a or 110-b or both) may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include various peripheral components. The peripheral components may be any input device or output device, or an interface (e.g., a bus, a set of pins) for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, and input component may include a user interface or interface with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (e.g., channels 115-a and or 115-b or both) and associated signal paths and terminals may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

A host device 105 may be configured to support a set of speed bins, where each supported speed bin may be associated with a respective clock rate and a respective timing constraint (e.g., an array access delay, a row precharge delay, a row address to column address delay). Memory module 107-a (e.g., a memory module including a memory device 110-a) may be configured to support a respective maximum clock rate and a respective timing constraint. When the host device 105 is coupled with the memory module 107-a, the memory module 107-a may indicate (e.g., via a register that includes serial presence detect (SPD) data) the maximum supported clock rate and the timing constraint. When the host device 105 downclocks to a lower clock rate, the host device 105 may select a speed bin from the set of supported speed bins that is compatible with the maximum supported clock rate and the timing constraint. Accordingly, the host device 105 may select a speed bin from the set of supported speed bins that is compatible with the maximum supported clock rate and the timing constraint. Upon selecting the compatible speed bin, the host device 105 may operate according to a timing constraint associated with the compatible speed bin.

In some examples, the host device 105 may be coupled with two memory modules 107-a and 107-b associated with different maximum supported clock rates or different values of timing constraints or both. When performing downclocking in such examples using other different techniques, the host device 105 may fail to support a speed bin that is compatible with both memory modules 107-a and 107-b for at least one clock rate at the host device. For instance, the speed bins associated with a particular value of a timing constraint (e.g., 20 nanoseconds) may not support communications with memory modules 107-a and 107-b for each possible combination of maximum supported clock rates, timing constraints, or both for memory modules 107-a and 107-b. As such, using other different techniques, the host device 105 may be incapable of communicating with both memory modules 107 concurrently or simultaneously in at least some instances.

In contrast, to enable the host device 105 to support concurrent (e.g., at least partially overlapping) or simultaneous communication with two or more memory modules 107 (e.g., memory modules 107-a and 107-b), speed bins associated with the particular value of the timing constraint (e.g., 20 nanoseconds) may be excluded from the set of speed bins among which the host device 105 selects. Additionally or alternatively, at least one speed bin associated with a clock rate (e.g., each clock rate) supported by the host device 105 may be compatible with each clock rate supported by a memory module equal to or higher than the clock rate associated with the speed bin supported by the host device 105. As such, the host device 105 may ensure that there is at least one speed bin compatible with multiple memory modules 107 when downclocking to a given clock rate, a given data rate, or both.

FIG. 2 illustrates an example of a downclocking scheme 200 that supports speed bins to support memory compatibility in accordance with examples as disclosed herein. Downclocking scheme 200 may implement or may be implemented by one or more components (e.g., an external memory controller 120) described with reference to system 100 of FIG. 1, among other examples. Downclocking scheme 200 shows a table that represents whether a speed bin at a host device is compatible with a memory device for various data rates (e.g., in units of megahertz (MHz)) or clock rates. Each column of the table may correspond to a particular speed bin identified by a host device to be associated with a memory module according to an identified supported clock rate (e.g., a maximum supported clock rate), an identified supported timing constraint, or both associated with the memory module. Each row of the table may correspond to a particular speed bin for a particular data rate or clock rate at a host device. Each speed bin for a particular data rate or clock rate may correspond to a particular value of a timing constraint (e.g., tRP, tRCD, tAA). For instance, speed bin "B" (i.e., B bin) may correspond to a lowest value of a timing constraint for each data rate or clock rate, speed bin "Dump" (i.e., dump bin) may correspond to a highest value of the timing constraint for each data rate or clock rate, and speed bin "C" (i.e., C Bin) may correspond to a value of the timing constraint in between the lowest value and the highest value for each data rate or clock rate. In some examples, speed bin "A" may be present for each clock rate at or above 3200 MHz and may correspond to a value of the timing constraint that is in lower than that of the B bin.

Each entry of the table may correspond to an unsupported configuration 205, a supported configuration 210, or an optionally supported configuration 215. An unsupported configuration 205 may represent a configuration in which a speed bin for a host device is not compatible with a memory module. For instance, unsupported configuration 205-a may indicate that a host device operating using a dump bin at a data rate of 3200 MHz may not support communications with a memory module with a maximum supported data rate of 4800 MHz and a timing constraint associated with a B bin. Supported configuration 210 may represent a configuration in which a speed bin for a host device is compatible with a memory module. For instance, supported configuration 210-a may indicate that a host device operating using a C bin at 4400 MHz supports communications with a memory module with a maximum supported data rate of 4400 MHz and a timing constraint associated with a C bin. An optionally supported configuration 215 may represent a configuration in which a speed bin for a host device may be selectively configured to be compatible with a memory module. For instance, optionally supported configuration 215-a may indicate that a host device may be selectively configured to support communications with a memory module when the host device is operating using a C bin at a data rate of 3200 MHz and when the memory module has a maximum supported data rate of 4400 MHz and a timing constraint associated with a C bin.

In some examples, the memory module being associated with a particular speed bin (e.g., a dump bin, A bin, B bin, C bin) may be a result of the memory module being configured and manufactured to support operating at determined conditions for the particular speed bin. For instance, after the memory module is configured, manufactured, or both, the memory module may be tested according to a set of manufacturing or configuration testing parameters associated with a testing configuration. The manufacturing or configuration testing parameters used in the testing configuration be used to determine the particular speed bin that the memory module is capable of supporting. In some examples, testing configurations associated with more stringent (e.g., more strict, more precise) manufacturing or configuration testing parameters may enable a host device to use (e.g., run) optionally supported bins (e.g., optionally supported configurations 215) with the memory module, whereas testing configurations associated with less stringent (e.g., less strict, less precise) manufacturing or configuration testing parameters may not enable the host device to use (e.g., run) optionally supported bins with the memory module. In some examples, the register of the memory module may include information associated with the manufacturing or configuration testing parameters.

The following describes some examples of related speed bins associated with downclocking scheme 200. For 2100 MHz, the timing constraint may be equal to 20.952 nanoseconds (e.g., 22 clock cycles). For 3200 MHz, the timing constraint for the dump bin may be equal to 20 nanoseconds (e.g., 32 clock cycles); the timing constraint for the C bin may be equal to 17.5 nanoseconds (e.g., 28 clock cycles); and the timing constraint for the B bin may be equal to 16.25 nanoseconds (e.g., 26 clock cycles). For 3600 MHz, the timing constraint for the dump bin may be equal to 20 nanoseconds (e.g., 36 clock cycles); the timing constraint for the C bin may be equal to 17.777 nanoseconds (e.g., 32 clock cycles); and the timing constraint for the B bin may be equal to 16.666 nanoseconds (e.g., 30 clock cycles). For 4000 MHz, the timing constraint for the dump bin may be equal to 20 nanoseconds (e.g., 40 clock cycles); the timing constraint for the C bin may be equal to 18 nanoseconds (e.g., 36 clock cycles); and the timing constraint for the B bin may be equal to 16 nanoseconds (e.g., 32 clock cycles). For 4400 MHz, the timing constraint for the dump bin may be equal to 20 nanoseconds (e.g., 44 clock cycles); the timing constraint for the B bin may be equal to 18.181 nanoseconds (e.g., 40 clock cycles); and the timing constraint for the C bin may be equal to 16.363 nanoseconds (e.g., 36 clock cycles). For 4800 MHz, the timing constraint for the dump bin may be equal to 20 nanoseconds (e.g., 48 clock cycles); the timing constraint for the C bin may be equal to 17.5 nanoseconds (e.g., 42 clock cycles); and the timing constraint for the B bin may be equal to 16.666 nanoseconds (e.g., 40 clock cycles). For 5200 MHz, the timing constraint for the dump bin may be equal to 20 nanoseconds (e.g., 52 clock cycles); the timing constraint for the C bin may be equal to 17.692 nanoseconds (e.g., 46 clock cycles); and the timing constraint for the B bin may be equal to 16.153 nanoseconds (e.g., 42 clock cycles). For 5600 MHz, the timing constraint for the dump bin may be equal to 20 nanoseconds (e.g., 56 clock cycles); the timing constraint for the C bin may be equal to 17.857 nanoseconds (e.g., 50 clock cycles); and the timing constraint for the B bin may be equal to 16.428 nanoseconds (e.g., 46 clock cycles). For 6000 MHz, the timing constraint for the dump bin may be equal to 20 nanoseconds (e.g., 60 clock cycles); the timing constraint for the C bin may be equal to 18 nanoseconds (e.g., 54 clock cycles); and the timing constraint for the B bin may be equal to 16 nanoseconds (e.g., 48 clock cycles). For 6400 MHz, the timing constraint for the dump bin may be equal to 20 nanoseconds (e.g., 64 clock cycles); the timing constraint for the C bin may be equal to 17.5 nanoseconds (e.g., 56 clock cycles); and the timing constraint for the B bin may be equal to 16.25 nanoseconds (e.g., 52 clock cycles). In some examples, the timing constraint values listed herein may be examples of nominal values (e.g., values of the timing constraints after performing rounding, such as truncating, on the timing constrain values).

For 2100 MHz at the host device, each speed bin associated with the memory module may be supported for 6400 MHz, 6000 MHz, 5600 MHz, 4800 MHz, 4400 MHz, 4000 MHz, 3600 MHz, and 3200 MHz. For 3200 MHz at the host device using the Dump bin, the B bin at the memory module may be supported for 6000 MHz, 5600 MHz, 5200 MHz, 4400 MHz, 4000 MHz, and 3600 MHz and the C bin at the memory module may be supported for 6000 MHz, 5600 MHz, 5200 MHz, 4400 MHz, 4000 MHz, and 3600 MHz. For 3200 MHz at the host device using the C bin, the B bin at the memory module may be supported for 6400 MHz, 6000 MHz, 5600 MHz, 4800 MHz, 4400 MHz, 4000 MHz, 3600 MHz, and 3200 MHz and the C bin at the memory module may be supported for 6400 MHz, 4800 MHz, and 3200 MHz and optionally supported for 6000 MHz, 5600 MHz, 5200 MHz, 4400 MHz, and 3600 MHz. For 3200 MHz at the host device using the B bin, the B bin at the memory module may be supported for 6400 MHz, 6000 MHz, 5200 MHz, 4000 MHz, and 3200 MHz and may be optionally supported for 5600 MHz, 4800 MHz, 4400 MHz, and 3600 MHz.

For 3600 MHz at the host device using the Dump bin, the B bin and the C bin at the memory module may be supported for 6000 MHz, 5600 MHz, 4400 MHz, and 4000 MHz. For 3600 MHz at the host device using the C bin, the B bin at the memory module may be supported for 6400 MHz, 6000 MHz, 5600 MHz, 4800 MHz, 4400 MHz, 4000 MHz, and 3600 MHz and the C bin at the memory module may be supported for 6400 MHz, 5200 MHz, 4800 MHz, and 3600 MHz and optionally supported for 6000 MHz, 5600 MHz, 4400 MHz, and 4000 MHz. For 3600 MHz at the host device using the B bin, the B bin at the memory module may be supported for 6400 MHz, 6000 MHz, 5600 MHz, 5200 MHz, 4800 MHz, 440 MHz, 4000 MHz, and 3600 MHz. For 4000 MHz at the host device using the Dump bin, the B bin and the C bin at the memory module may be supported for 4400 MHz. For 4000 MHz at the host device using the C bin, the B bin at the memory module may be supported for 6400 MHz, 6000 MHz, 5600 MHz, 4800 MHz, 4400 MHz, and 4000 MHz, and the C bin at the memory module may be supported for 6400 MHz, 6000 MHz, 5600 MHz, 4800 MHz, and 4000 MHz and optionally supported for 4400 MHz. For 4000 MHz at the host device using the B bin, the B bin at the memory module may be supported for 6000 MHz and 4000 MHz and optionally supported for 6400 MHz, 5600 MHz, 5200 MHz, 4800 MHz, and 4400 MHz.

For 4400 MHz at the host device using the Dump bin, neither the B bin and the C bin at the memory module may be supported. For 4400 MHz at the host device using the C bin, the B bin and the C bin at the memory module may be supported for 6400 MHz, 6000 MHz, 5600 MHz, 4800 MHz, and 4400 MHz. For 4400 MHz at the host device using the B bin, the B bin at the memory module may be supported for 6400 MHz, 6000 MHz, 5200 MHz, and 4400 MHz and optionally supported for 5600 MHz and 4800 MHz. For 4800 MHz at the host device using the Dump bin, the B bin and the C bin at the memory module may be supported for 6000 MHz, 5600 MHz, and 5200 MHz. For 4800 MHz at the host device using the C bin, the B bin at the memory module may be supported for 6400 MHz, 6000 MHz, 5600 MHz, and 4800 MHz, and the C bin at the memory module may be supported for 6400 MHz and 4800 MHz and optionally supported for 6000 MHz, 5600 MHz, and 5200 MHz. For 4800 MHz at the host device using the B bin, the B bin at the memory module may be supported for 6400 MHz, 6000 MHz, 5600 MHz, 5200 MHz, and 4800 MHz.

For 5200 MHz at the host device using the Dump bin, the B bin and the C bin at the memory module may be supported for 6000 MHz and 5600 MHz. For 5200 MHz at the host device using the C bin, the B bin at the memory module may be supported for 6400 MHz, 6000 MHz, 5600 MHz, and 5200 MHz, and the C bin at the memory module may be supported for 6400 MHz and 5200 MHz and optionally supported for 6000 MHz and 5600 MHz. For 5200 MHz at the host device using the B bin, the B bin at the memory module may be supported for 6000 MHz and 5200 MHz and optionally supported for 6400 MHz and 5600 MHz. For 5600 MHz at the host device using the Dump bin, the B bin and the C bin at the memory module may be supported for 6000 MHz. For 5600 MHz at the host device using the C bin, the B bin at the memory module may be supported for 6400 MHz, 6000 MHz, and 5600 MHz, and the C bin at the memory module may be supported for 6400 MHz and 5600 MHz and optionally supported for 6000 MHz. For 5200 MHz at the host device using the B bin, the B bin at the memory module may be supported for 6400 MHz, 6000 MHz, and 5600 MHz.

For 6000 MHz at the host device using the Dump bin, neither the B bin or the C bin at the memory module may be supported. For 6000 MHz at the host device using the B bin, the B bin and the C bin at the memory module may be supported for 6400 MHz and 6000 MHz. For 6000 MHz at the host device using the B bin, the B bin at the memory module may be supported for 6000 MHz and optionally supported for 6400 MHz. For 6400 MHz at the host device using the Dump bin, neither the B bin or the C bin at the memory module may be supported. For 6400 MHz at the host device using the C bin, the B bin and the C bin at the memory module may be supported for 6400 MHz. For 6400 MHz at the host device using the C bin, the B bin at the memory module may be supported for 6400 MHz.

In some examples, a host device may initially be configured to use a C bin at a data rate of 4400 MHz (e.g., the host device may be in supported configuration 210-$a$) when communicating with a first memory module that has a supported data rate (e.g., maximum supported data rate) of 4400 MHz and a timing constraint associated with a C bin. In some examples, the host device may be downclocked from 4400 MHz to a data rate of 3200 MHz. If optionally supported configuration 215-$a$ is supported (e.g., by the first memory module, by the host device) the host device may select to use the C bin at 3200 MHz. However, in instances where optionally supported configuration 215-$a$ is not supported (e.g., by the first memory module, by the host device) the host device may instead select to use the dump bin at 3200 MHz (e.g., supported configuration 210-$b$).

In some examples, the host device may coupled with a second memory module that has a supported data rate (e.g., maximum supported data rate) of 4800 MHz and a timing constraint associated with a B bin (e.g., when the host device and the second memory module are in supported configuration 210-$c$). The host device may not be capable of communicating using multiple data rates or speed bins or both at once. Accordingly, when the host device downclocks to 3200 MHz, the host device may attempt to communicate with the first and the second memory modules at 3200 MHz. If optionally supported configuration 215-$a$ is supported (e.g., by the first memory module, the host device), the host device may communicate with the first memory module and the second memory module according to the C bin at 3200 MHz (e.g., as the C bin at 3200 MHz is supported for the first memory module and the second memory module). If optionally supported configuration 215-$a$ is not supported (e.g., by the first memory module, by the host device), however, the host device may attempt to communicate with the first and second memory module according to the dump bin at 3200 MHz. In some examples, the dump bin at 3200 MHz may be supported for the first memory module (e.g., supported configuration 210-$b$), but may not be supported for the second memory module (e.g., unsupported configuration 205-$a$). Accordingly, if the host device downclocks to 3200 MHz, the host device may be unable to communicate with the second memory module.

To enable the host device to communicate with the first memory module and the second memory module, for example, when downclocking, the host device may eliminate support for one or more dump bins and may convert optionally supported configurations 215 for C bins at the host device to supported configurations 210. Additional details about enabling the host device in this manner may be described herein, for example, at least with reference to FIG. 3.

Figure 3:
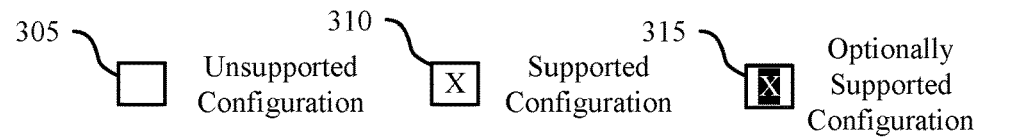
FIG. 3 illustrates an example of a downclocking scheme that supports speed bins to support memory compatibility in accordance with examples as disclosed herein.

FIG. 3 illustrates an example of a downclocking scheme 300 that supports speed bins to support memory compatibility in accordance with examples as disclosed herein. Downclocking scheme 300 may implement or may be implemented by one or more components described with reference to system 100 of FIG. 1 (e.g., an external memory controller 120), among other examples. Downclocking scheme 300 may represent the table of downclocking scheme 200 after eliminating support for dump bins (e.g., having each configuration when using a dump bin be an unsupported configuration 205) and converting each optionally supported configuration for C bins at the host device to a supported configuration (e.g., converting optionally supported configurations 215 to supported configurations 210).

In some examples, a host device may initially be configured to use a C bin at a data rate of 4400 MHz (e.g., the host device may be in supported configuration 310-$a$) when communicating with a first memory module that has a supported data rate (e.g., a maximum supported data rate) of 4400 MHz and a timing constraint associated with a C bin. In some examples, the host device may be downclocked from 4400 MHz to a data rate of 3200 MHz. The host device may support supported configuration 310-$b$, and may therefore select to use the C bin at 3200 MHz.

In some examples, the host device may be coupled with a second memory module that has a supported data rate (e.g., maximum supported data rate) of 4800 MHz and a timing constraint associated with a B bin (e.g., when the host device and the second memory module are in supported configuration 310-$c$). The host device, however, may not be capable of communicating using multiple data rates or speed bins or both at once. Accordingly, when the host device downclocks to 3200 MHz, the host device may attempt to communicate with the first and the second memory modules at 3200 MHz. As the host device supports using the C bin for the first and second memory modules (e.g., the host device supports supported configurations 310-$b$ and 310-$d$, respectively), the host device may communicate with the first memory module and the second memory module according to the C bin at 3200 MHz. Accordingly, by eliminating support for configurations using the dump bin and converting optionally supported configurations for C bins at the host device to supported configurations, the host device may communicate with both memory modules after performing downclocking.

Performing the methods as described herein, for instance regarding the features described with reference to FIG. 3, may be associated with one or more advantages. For instance, host devices that use downclocking scheme 300 when downclocking may be able to communicate with multiple memory modules regardless of the speed bins used by the memory modules. Accordingly, host devices that use downclocking scheme 300 may have greater flexibility in adjusting their clock rates or data rates when maintaining communication with multiple memory modules. Additionally, host devices that use downclocking scheme 300 may maintain backwards compatibility with memory modules.

Figure 4:
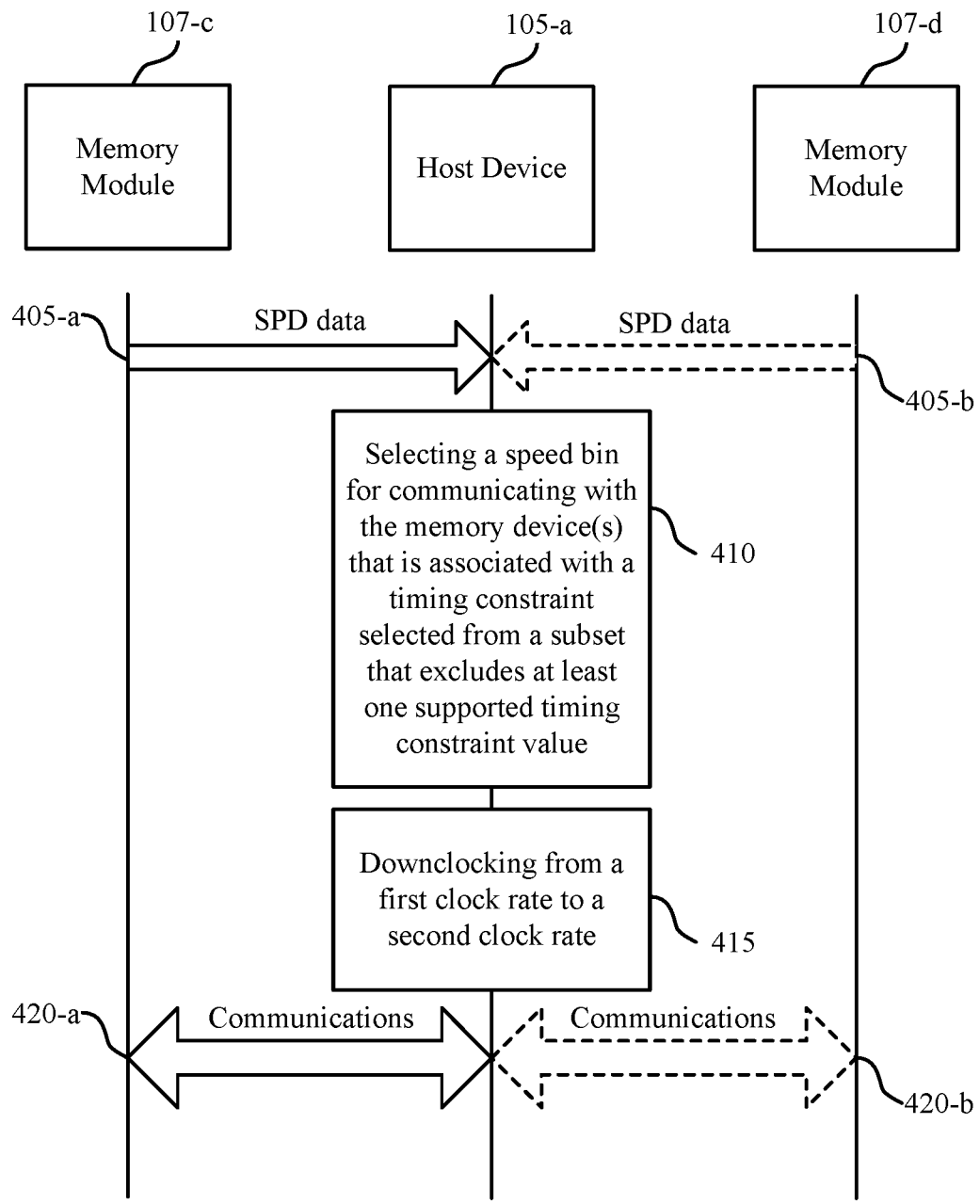
FIG. 4 illustrates an example of a process flow that supports speed bins to support memory compatibility in accordance with examples as disclosed herein.

FIG. 4 illustrates an example of a process flow 400 that supports speed bins to support memory compatibility in accordance with examples as disclosed herein. In some examples, host device 105-$a$ may be an example of a host device 105 as described with reference to FIG. 1 and memory modules 107-*c* and 107-*d* may be examples of memory modules 107 (e.g., memory modules 107-*a* and 107-*b*) as described with reference to FIG. 1.

At 405-*a*, memory module 107-*c* may provide, to host device 105-*a*, a value of a register including SPD data of memory module 107-*c*, the SPD data indicative of a timing constraint for operating the memory module at a corresponding first clock rate, the timing constraint and the first clock rate (e.g., a first maximum supported clock rate) associated with a first speed bin. At 405-*b*, memory module 107-*d* may provide, to host device 105-*b*, a value of a second register including SPD data of memory module 107-*d*, the SPD data of a second timing constraint for operating memory module 107-*d* at a corresponding second clock rate (e.g., a second maximum supported clock rate), the second timing constraint and the third clock rate associated with a second speed bin. In some examples, host device 105-*a* may read the SPD data of memory module 107-*c* from memory module 107-*c* and may read the SPD data of memory module 107-*d* from memory module 107-*d*.

In some alternative examples, the memory module 107-*c* or the memory module 107-*d* (or both concurrently, simultaneously, or serially) may provide (e.g., transmit) various information to the host device 105-*a*. For example, at 405-*a*, memory module 107-*c* may provide (e.g., transmit, convey, indicate), to host device 105-*a*, an indication of a value of or a value itself of a location (e.g., a register) including SPD data of memory module 107-*c*, the SPD data indicative of or including a first timing constraint for operating the memory module 107-*c* at a corresponding first clock rate, the timing constraint and the first clock rate associated with a first speed bin. At 405-*b*, memory module 107-*d* may provide (e.g., transmit, convey, indicate), to host device 105-*b*, an indication of a value of or a value itself of a location (e.g., a register) including SPD data of memory module 107-*d*, the SPD data indicative of or including a second timing constraint for operating memory module 107-*d* at a corresponding second clock rate, the second timing constraint and the second clock rate associated with a second speed bin.

In some alternative examples, host device 105-*a* may read (e.g., receive) from the memory module 107-*c* or the memory module 107-*d* (or both concurrently, simultaneously, or serially) various information. For example, at 405-*a*, host device 105-*a* may read (e.g., receive, retrieve) from memory module 107-*c*, an indication of a value of or a value itself of a location (e.g., a register) including SPD data of memory module 107-*c*, the SPD data indicative of or including a first timing constraint for operating the memory module 107-*c* at a corresponding first clock rate, the timing constraint and the first clock rate associated with a first speed bin. At 405-*b*, host device 105-*a* may read (e.g., receive, retrieve) from memory module 107-*c*, an indication of a value of or a value itself of a location (e.g., a register) including SPD data of memory module 107-*d*, the SPD data indicative of or including a of timing constraint for operation the memory module 107-*d*, the SPD data indicative of or including a second timing constraint for operating memory module 107-*d* at a corresponding second clock rate, the second timing constraint and the second clock rate associated with a second speed bin.

In some examples, the timing constraint may correspond to one or more of a row precharge delay (e.g., tRP), a row address to column address delay (e.g., tRCD), or an array access delay (e.g., tAA). In some examples, the timing constraint may correspond to a quantity of clock cycles for accessing a memory array of memory module 107-*c* and/or the second timing constraint may correspond to a quantity of clock cycles for accessing a memory array of memory module 107-*d*.

At 410, host device 105-*a* may select, for communication with the memory module, a third speed bin associated with a third clock rate at host device 105-*a* and the timing constraint. Host device 105-*a* may support operations according to a set of timing constraints that include a set of values. Memory module 107-*c* and memory module 107*d* may support operations according to the set of timing constraints. The timing constraint may be selected from a subset of the set of timing constraints, where the subset is exclusive of at least one of the set of values (e.g., 20 nanoseconds). In some examples, the second timing constraint may be one of the subset of timing constraints. In some examples, each of the at least one of the set of values excluded from the subset may have a higher magnitude than each other value or each one or more remaining values of the set in the subset.

At 415, host device 105-*a* may downclock from a fourth clock rate to the third clock rate based on reading the value of the second register including the SPD data of memory module 107-*d*. Additionally or alternatively, host device 105-*a* may downclock from a fourth clock rate to the third clock rate based on reading the value of the register including the SPD data of memory module 107-*c*.

At 420-*a*, host device 105-*a* may communicate with the memory module 107-*c* according to the third speed bin and memory module 107-*c* may communicate with host device 105-*a* according to the first speed bin. At 420-*b*, host device 105-*a* may communicate with memory module 107-*d* according to the third speed bin and memory module 107-*d* may communicate with host device 105-*a* according to the second speed bin. In some examples, communicating with memory module 107-*c* and/or memory module 107-*d* may be based on the downclocking. In some examples, communicating with memory module 107-*d* may be based on a first value of the second timing constraint being associated with a shorter duration than a second value of the timing constraint associated with memory module 107-*c*. In some examples, communicating with memory module 107-*c* and memory module 107-*d* may be based on the first clock rate and the second clock rate being equal to or greater than the third clock rate of host device 105-*a*.

Performing the methods as described herein, for instance regarding the features described with reference to FIG. 4, may have one or more advantages. For instance, by excluding the at least one value from the set of values, the host device may prevent a selection of a speed bin that is not supported for communications with at least one of memory modules 107-*c* and 107-*d*.

Figure 5:
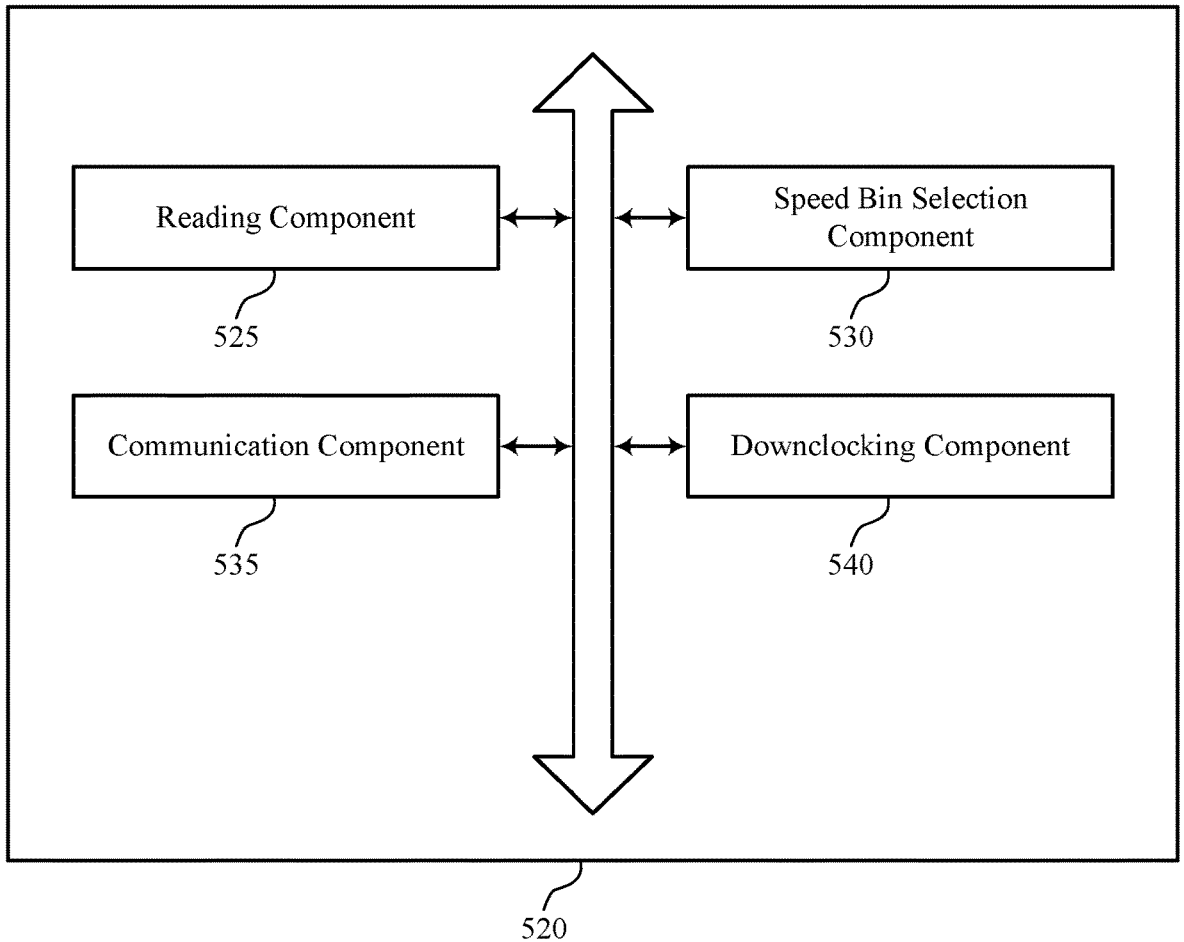
FIG. 5 shows a block diagram of a host device that supports speed bins to support memory compatibility in accordance with examples as disclosed herein.

FIG. 5 shows a block diagram 500 of a host device 520 that supports speed bins to support memory compatibility in accordance with examples as disclosed herein. The host device 520 may be an example of aspects of a host device as described with reference to FIGS. 1 through 4. The host device 520, or various components thereof, may be an example of means for performing various aspects of speed bins to support memory compatibility as described herein. For example, the host device 520 may include a reading component 525, a speed bin selection component 530, a communication component 535, a downclocking component 540, or any combination thereof. Each of these components may communicate, directly or indirectly, with one another (e.g., via one or more buses).

The reading component 525 may be configured as or otherwise support a means for reading, by the host device, a value of a register including serial presence detect (SPD) data of a memory module, the SPD data indicative of a timing constraint for operating the memory module at a corresponding first clock rate, the timing constraint and the corresponding first clock rate associated with a first speed bin. The speed bin selection component 530 may be configured as or otherwise support a means for selecting, for communication with the memory module, a second speed bin associated with a second clock rate at the host device and the timing constraint, where the host device supports operations according to a set of timing constraints that includes a plurality of values, and where the timing constraint is selected from a subset of the set of timing constraints, the subset exclusive of at least one of the plurality of values. The communication component 535 may be configured as or otherwise support a means for communicating with the memory module according to the second speed bin.

In some examples, the reading component 525 may be configured as or otherwise support a means for reading, by the host device, a value of a second register including SPD data of a second memory module, the SPD data of the second memory module indicative of a second timing constraint for operating the second memory module at a corresponding third clock rate, the second timing constraint and a third clock rate associated with a third speed bin. In some examples, the speed bin selection component 530 may be configured as or otherwise support a means for selecting, for communication with the memory module, the second speed bin associated with the second clock rate and the timing constraint, where the second timing constraint is one of the subset of the set of timing constraints. In some examples, the communication component 535 may be configured as or otherwise support a means for communicating with the second memory module according to the second speed bin.

In some examples, the downclocking component 540 may be configured as or otherwise support a means for downclocking, at the host device, from a fourth clock rate to the second clock rate based at least in part on reading the value of the second register including the SPD data of the second memory module, where communicating with the memory module and the second memory module according to the second speed bin is based at least in part on the downclocking.

In some examples, communicating with the second memory module is based at least in part on a first value of the second timing constraint being associated with a shorter duration than a second value of the timing constraint.

In some examples, communicating with the memory module and the second memory module according to the second speed bin is based at least in part on the corresponding first clock rate and the third clock rate each being equal to or greater than the second clock rate.

In some examples, the downclocking component 540 may be configured as or otherwise support a means for downclocking, at the host device, from a third clock rate to the second clock rate based at least in part on reading the value of the register including the SPD data of the memory module, where communicating with the memory module according to the second speed bin is based at least in part on the downclocking.

In some examples, the speed bin selection component 530 may be configured as or otherwise support a means for selecting the timing constraint from the subset of the set of timing constraints as part of selecting the second speed bin.

In some examples, each of the at least one of the plurality of values excluded from the subset has a higher magnitude than each value of the plurality of values in the subset.

In some examples, the timing constraint corresponds to one or more of a row precharge delay, a row address to column address delay, or an array access delay.

In some examples, the timing constraint corresponds to a quantity of clock cycles for accessing a memory array of the memory module.

Figure 6:
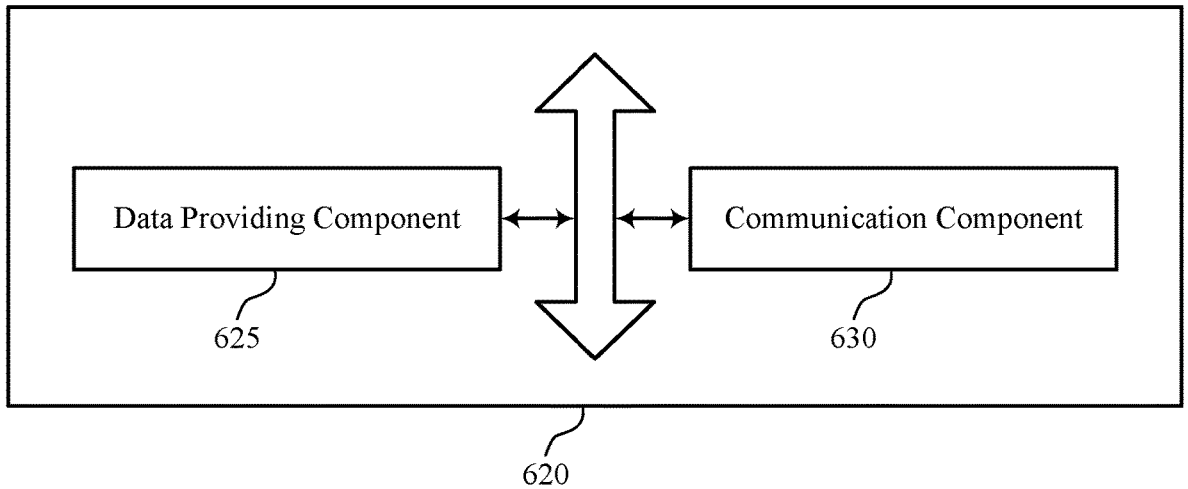
FIG. 6 shows a block diagram of a memory device that supports speed bins to support memory compatibility in accordance with examples as disclosed herein.

FIG. 6 shows a block diagram 600 of a memory device 620 that supports speed bins to support memory compatibility in accordance with examples as disclosed herein. The memory device 620 may be an example of aspects of a memory device as described with reference to FIGS. 1 through 4. The memory device 620, or various components thereof, may be an example of means for performing various aspects of speed bins to support memory compatibility as described herein. For example, the memory device 620 may include a data providing component 625 a communication component 630, or any combination thereof. Each of these components may communicate, directly or indirectly, with one another (e.g., via one or more buses).

The data providing component 625 may be configured as or otherwise support a means for providing, to a host device, a value of a register including serial presence detect (SPD) data of a memory module, the SPD data indicative of a timing constraint for operating the memory module at a corresponding first clock rate, the timing constraint and the corresponding first clock rate associated with a first speed bin, where the memory module supports operations according to a set of timing constraints that includes a plurality of values, and where the timing constraint is selected from a subset of the set of timing constraints, the subset exclusive of at least one of the plurality of values. The communication component 630 may be configured as or otherwise support a means for communicating with the host device according to the first speed bin.

In some examples, each of the at least one of the plurality of values excluded from the subset has a higher magnitude than each value of the plurality of values in the subset.

In some examples, the timing constraint corresponds to one or more of a row precharge delay, a row address to column address delay, or an array access delay.

In some examples, the timing constraint corresponds to a quantity of clock cycles for accessing a memory array of the memory module.

Figure 7:
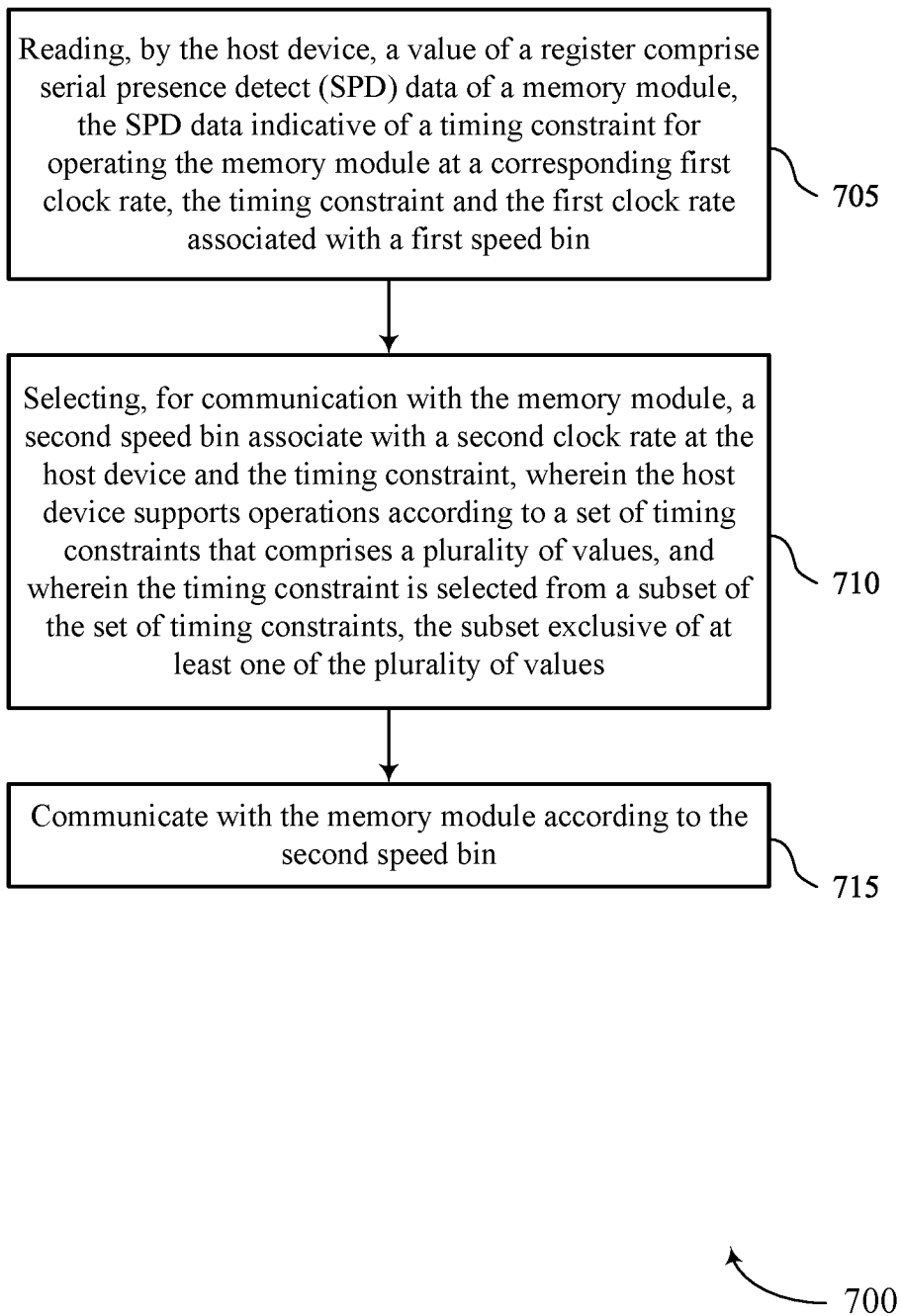
FIGS. 7 and 8 show flowcharts illustrating a method or methods that support speed bins to support memory compatibility in accordance with examples as disclosed herein.

FIG. 7 shows a flowchart illustrating a method 700 that supports speed bins to support memory compatibility in accordance with examples as disclosed herein. The operations of method 700 may be implemented by a host device or its components as described herein. For example, the operations of method 700 may be performed by a host device as described with reference to FIGS. 1 through 5. In some examples, a host device may execute a set of instructions to control the functional elements of the device to perform the described functions. Additionally or alternatively, the host device may perform aspects of the described functions using special-purpose hardware.

At 705, the method may include reading, by the host device, a value of a register including serial presence detect (SPD) data of a memory module, the SPD data indicative of a timing constraint for operating the memory module at a corresponding first clock rate, the timing constraint and the corresponding first clock rate associated with a first speed bin. The operations of 705 may be performed in accordance with examples as disclosed herein. In some examples, aspects of the operations of 705 may be performed by a reading component 525 as described with reference to FIG. 5.

In some alternative examples, the host device may read (e.g., receive) from a first memory module or a second memory module (or both concurrently, simultaneously, or serially) various information. For example, the host device may read (e.g., receive, retrieve) from the first memory module, an indication of a value of or a value itself of a location (e.g., a register) including SPD data of the first memory module, the SPD data indicative of or including a first timing constraint for operating the first memory module at a corresponding first clock rate, the timing constraint and the corresponding first clock rate associated with a first speed bin. Additionally or alternatively, the host device may read (e.g., receive, retrieve) from the second memory module, an indication of a value of or a value itself of a location (e.g., a register) including SPD data of the second memory module, the SPD data indicative of or including a of timing constraint for operation the second memory module, the SPD data indicative of or including a second timing constraint for operating the second memory module at a corresponding second clock rate, the second timing constraint and the second clock rate associated with a second speed bin.

At 710, the method may include selecting, for communication with the memory module, a second speed bin associated with a second clock rate at the host device and the timing constraint, where the host device supports operations according to a set of timing constraints that includes a plurality of values, and where the timing constraint is selected from a subset of the set of timing constraints, the subset exclusive of at least one of the plurality of values. The operations of 710 may be performed in accordance with examples as disclosed herein. In some examples, aspects of the operations of 710 may be performed by a speed bin selection component 530 as described with reference to FIG. 5.

At 715, the method may include communicating with the memory module according to the second speed bin. The operations of 715 may be performed in accordance with examples as disclosed herein. In some examples, aspects of the operations of 715 may be performed by a communication component 535 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for reading, by the host device, a value of a register including serial presence detect (SPD) data of a memory module, the SPD data indicative of a timing constraint for operating the memory module at a corresponding first clock rate, the timing constraint and the corresponding first clock rate associated with a first speed bin, selecting, for communication with the memory module, a second speed bin associated with a second clock rate at the host device and the timing constraint, where the host device supports operations according to a set of timing constraints that includes a plurality of values, and where the timing constraint is selected from a subset of the set of timing constraints, the subset exclusive of at least one of the plurality of values, and communicating with the memory module according to the second speed bin.

Some examples of the method 700 and the apparatus described herein may further include operations, features, circuitry, logic, means, or instructions for reading, by the host device, a value of a second register including SPD data of a second memory module, the SPD data of the second memory module indicative of a second timing constraint for operating the second memory module at a corresponding third clock rate, the second timing constraint and a third clock rate associated with a third speed bin, selecting, for communication with the memory module, the second speed bin associated with the second clock rate and the timing constraint, where the second timing constraint may be one of the subset of the set of timing constraints, and communicating with the second memory module according to the second speed bin.

Some examples of the method 700 and the apparatus described herein may further include operations, features, circuitry, logic, means, or instructions for downclocking, at the host device, from a fourth clock rate to the second clock rate based at least in part on reading the value of the second register including the SPD data of the second memory module, where communicating with the memory module and the second memory module according to the second speed bin may be based at least in part on the downclocking.

In some examples of the method 700 and the apparatus described herein, communicating with the second memory module may be based at least in part on a first value of the second timing constraint being associated with a shorter duration than a second value of the timing constraint.

In some examples of the method 700 and the apparatus described herein, communicating with the memory module and the second memory module according to the second speed bin may be based at least in part on the corresponding first clock rate and the third clock rate each being equal to or greater than the second clock rate.

Some examples of the method 700 and the apparatus described herein may further include operations, features, circuitry, logic, means, or instructions for downclocking, at the host device, from a third clock rate to the second clock rate based at least in part on reading the value of the register including the SPD data of the memory module, where communicating with the memory module according to the second speed bin may be based at least in part on the downclocking.

Some examples of the method 700 and the apparatus described herein may further include operations, features, circuitry, logic, means, or instructions for selecting the timing constraint from the subset of the set of timing constraints as part of selecting the second speed bin.

In some examples of the method 700 and the apparatus described herein, each of the at least one of the plurality of values excluded from the subset has a higher magnitude than each value of the plurality of values in the subset.

In some examples of the method 700 and the apparatus described herein, the timing constraint corresponds to one or more of a row precharge delay, a row address to column address delay, or an array access delay.

In some examples of the method 700 and the apparatus described herein, the timing constraint corresponds to a quantity of clock cycles for accessing a memory array of the memory module.

Figure 8:
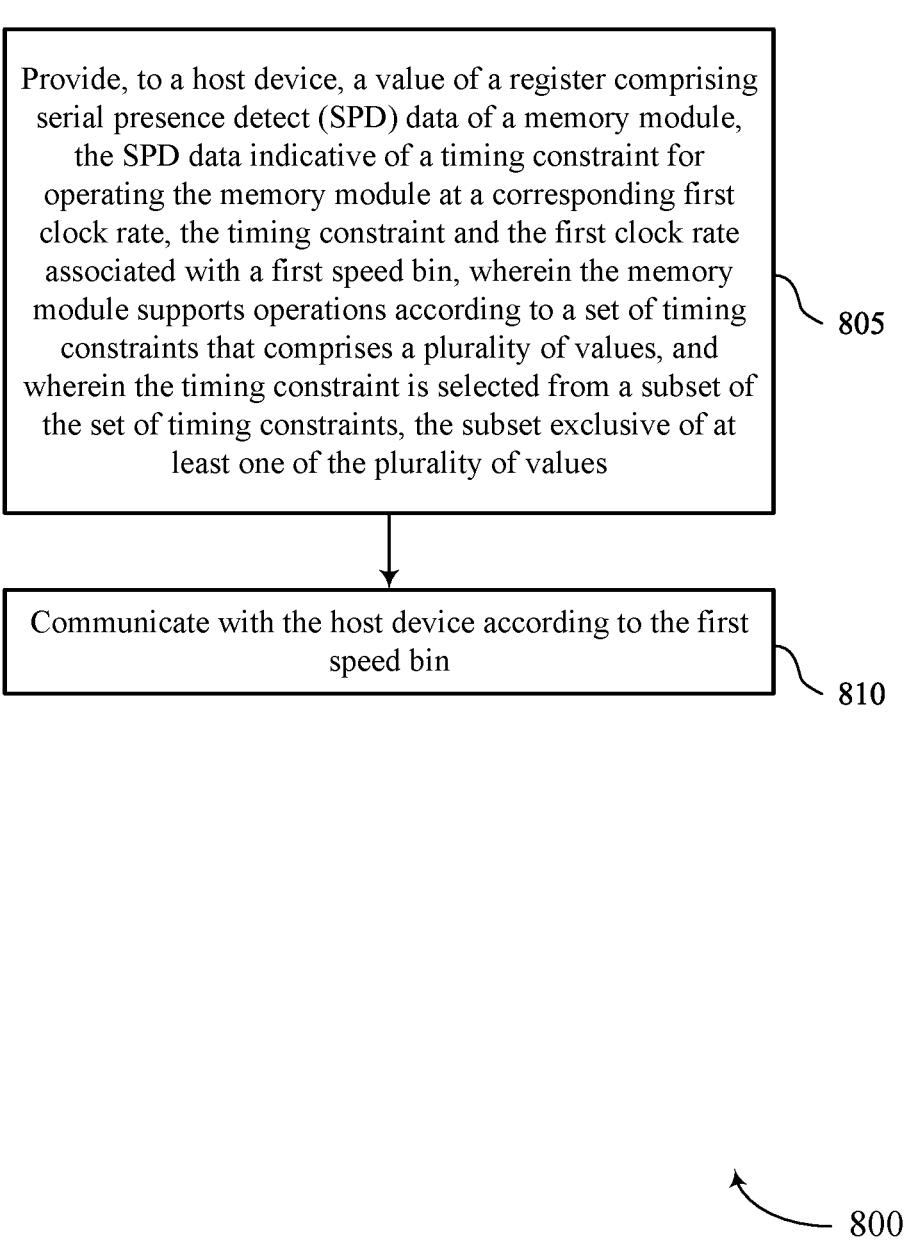

FIG. 8 shows a flowchart illustrating a method 800 that supports speed bins to support memory compatibility in accordance with examples as disclosed herein. The operations of method 800 may be implemented by a memory device or its components as described herein. For example, the operations of method 800 may be performed by a memory device as described with reference to FIGS. 1 through 4 and 6. In some examples, a memory device may execute a set of instructions to control the functional elements of the device to perform the described functions. Additionally or alternatively, the memory device may perform aspects of the described functions using special-purpose hardware.

At 805, the method may include providing, to a host device, a value of a register including serial presence detect (SPD) data of a memory module, the SPD data indicative of a timing constraint for operating the memory module at a corresponding first clock rate, the timing constraint and the corresponding first clock rate associated with a first speed bin, where the memory module supports operations according to a set of timing constraints that includes a plurality of values, and where the timing constraint is selected from a subset of the set of timing constraints, the subset exclusive of at least one of the plurality of values. The operations of 805 may be performed in accordance with examples as disclosed herein. In some examples, aspects of the operations of 805 may be performed by a data providing component 625 as described with reference to FIG. 6.

In some alternative examples, the memory module may provide (e.g., transmit) various information to the host device 105-*a*. For example the memory module may provide (e.g., transmit, convey, indicate), to the host device, an indication of a value of or a value itself of a location (e.g., a register) including SPD data of the memory module, the SPD data indicative of or including a first timing constraint for operating the memory module at a corresponding first clock rate, the timing constraint and the corresponding first clock rate associated with a first speed bin. In some examples, the memory module may provide (e.g., transmit) the various information concurrently, simultaneously, or serially with another memory module.

At 810, the method may include communicating with the host device according to the first speed bin. The operations of 810 may be performed in accordance with examples as disclosed herein. In some examples, aspects of the operations of 810 may be performed by a communication component 630 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for providing, to a host device, a value of a register including serial presence detect (SPD) data of a memory module, the SPD data indicative of a timing constraint for operating the memory module at a corresponding first clock rate, the timing constraint and the corresponding first clock rate associated with a first speed bin, where the memory module supports operations according to a set of timing constraints that includes a plurality of values, and where the timing constraint is selected from a subset of the set of timing constraints, the subset exclusive of at least one of the plurality of values and communicating with the host device according to the first speed bin.

In some examples of the method 800 and the apparatus described herein, each of the at least one of the plurality of values excluded from the subset has a higher magnitude than each value of the plurality of values in the subset.

In some examples of the method 800 and the apparatus described herein, the timing constraint corresponds to one or more of a row precharge delay, a row address to column address delay, or an array access delay.

In some examples of the method 800 and the apparatus described herein, the timing constraint corresponds to a quantity of clock cycles for accessing a memory array of the memory module.

It should be noted that the methods described herein describe possible implementations, and that the operations and the steps may be rearranged or otherwise modified and that other implementations are possible. Further, portions from two or more of the methods may be combined.

Another apparatus is described. The apparatus may include a circuit configured to cause the apparatus to, read, by the apparatus, a value of a register including serial presence detect (SPD) data of a memory module, the SPD data indicative of a timing constraint for operating the memory module at a corresponding first clock rate, the timing constraint and the corresponding first clock rate associated with a first speed, select, for communication with the memory module, a second speed bin associated with a second clock rate at the apparatus and the timing constraint, where the apparatus supports operations according to a set of timing constraints that includes a plurality of values, and where the timing constraint is selected from a subset of the set of timing constraints, the subset exclusive of at least one of the plurality of values, and communicate with the memory module according to the second speed bin In some examples, the circuit may be further configured to cause the apparatus to read, by the apparatus, a value of a second register including SPD data of a second memory module, the SPD data of the second memory module indicative of a second timing constraint for operating the second memory module at a corresponding third clock rate, the second timing constraint and a third clock rate associated with a third speed bin, select, for communication with the second memory module, the second speed bin associated with the second clock rate and the apparatus and the timing constraint, where the second timing constraint may be one of the subset of the set of timing constraints, and communicate with the second memory module according to the second speed bin.

In some examples of the apparatus, the circuit may be further configured to cause the apparatus to downclock, at the apparatus, from a fourth clock rate to the second clock rate based at least in part on reading the value of the second register including the SPD data of the second memory module, where communicating with the memory module and the second memory module according to the second speed bin may be based at least in part on the downclocking.

In some examples, communicating with the second memory module may be based at least in part on a first value of the second timing constraint being associated with a shorter duration than a second value of the timing constraint.

In some examples, communicating with the memory module and the second memory module according to the second speed bin may be based at least in part on the corresponding first clock rate and the third clock rate each being equal to or greater than the second clock rate.

In some examples of the apparatus, the circuit may be further configured to cause the apparatus to downclock, at the apparatus, from a third clock rate to the second clock rate based at least in part on reading the value of the register including the SPD data of the memory module, where communicating with the memory module according to the second speed bin may be based at least in part on the downclocking.

In some examples, the apparatus may include select the timing constraint from the subset of the set of timing constraints as part of selecting the second speed bin.

In some examples of the apparatus, each of the at least one of the plurality of values excluded from the subset has a higher magnitude than each value of the plurality of values in the subset.

In some examples of the apparatus, the timing constraint corresponds to one or more of a row precharge delay, a row address to column address delay, or an array access delay.

In some examples of the apparatus, the timing constraint corresponds to a quantity of clock cycles for accessing a memory array of the memory module.

Another apparatus is described. The apparatus may include a circuit configured to cause the apparatus to, provide, to a host device, a value of a register including serial presence detect (SPD) data of a memory module, the SPD data indicative of a timing constraint for operating the memory module at a corresponding first clock rate, the timing constraint and the corresponding first clock rate associated with a first speed bin, where the memory module supports operations according to a set of timing constraints that includes a plurality of values, and where the timing constraint is selected from a subset of the set of timing constraints, the subset exclusive of at least one of the plurality of values, and communicate with the host device according to the first speed bin In some examples of the apparatus, each of the at least one of the plurality of values excluded from the subset has a higher magnitude than each value of the plurality of values in the subset.

In some examples of the apparatus, the timing constraint corresponds to one or more of a row precharge delay, a row address to column address delay, or an array access delay.

In some examples of the apparatus, the timing constraint corresponds to a quantity of clock cycles for accessing a memory array of the memory module.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent each of 1 the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method at a host device, comprising:
   reading a value of a register comprising serial presence detect (SPD) data of a memory module, the SPD data indicative of a first value of a timing constraint for operating the memory module at a corresponding first clock rate, the first value of the timing constraint and the first clock rate associated with a first speed bin;
   selecting, for communication with the memory module, a second speed bin associated with a second clock rate at the host device and a second value of the timing constraint, wherein the second clock rate is lower than the first clock rate and the second value of the timing constraint is higher than or equal to the first value of the timing constraint; and
   communicating with the memory module according to the second speed bin.

2. The method of claim 1, further comprising:
   downclocking from a third clock rate to the second clock rate based at least in part on reading the value of the register comprising the SPD data of the memory module, wherein communicating with the memory module according to the second speed bin is based at least in part on the downclocking.

3. The method of claim 1, further comprising:
   determining the second value of the timing constraint as part of selecting the second speed bin.

4. The method of claim 1, wherein the timing constraint corresponds to one or more of a row precharge delay, a row address to column address delay, or an array access delay.

5. The method of claim 1, wherein the timing constraint corresponds to a quantity of clock cycles for accessing a memory array of the memory module.

6. The method of claim 5, wherein the first value of the timing constraint corresponds to a first quantity of clock cycles and the second value of the timing constraint corresponds to a second quantity of clock cycles.

7. The method of claim 6, wherein the second quantity of clock cycles is less than the first quantity of clock cycles.

8. The method of claim 1, wherein the first clock rate is associated with a first data rate and the second clock rate is associated with a second data rate, wherein the second data rate is lower than the first data rate.

9. A system, comprising:
   a host device; and
   processing circuitry coupled with the host device and configured to cause the system to:
   read, by the host device, a value of a register comprising serial presence detect (SPD) data of a memory module, the SPD data indicative of a first value of a timing constraint for operating the memory module at a corresponding first clock rate, the first value of the timing constraint and the first clock rate associated with a first speed bin;

select, for communication with the memory module, a second speed bin associated with a second clock rate at the host device and a second value of the timing constraint, wherein the second clock rate is lower than the first clock rate and the second value of the timing constraint is higher than or equal to the first value of the timing constraint; and communicate with the memory module according to the second speed bin.

10. The system of claim 9, wherein the processing circuitry is further configured to cause the system to:

downclock, at the host device, from a third clock rate to the second clock rate based at least in part on reading the value of the register comprising the SPD data of the memory module, wherein communicating with the memory module according to the second speed bin is based at least in part on the downclocking.

11. The system of claim 9, wherein the processing circuitry is further configured to cause the system to:

determine the second value of the timing constraint as part of selecting the second speed bin.

12. The system of claim 9, wherein the timing constraint corresponds to one or more of a row precharge delay, a row address to column address delay, or an array access delay.

13. The system of claim 9, wherein the timing constraint corresponds to a quantity of clock cycles for accessing a memory array of the memory module.

14. The system of claim 13, wherein the first value of the timing constraint corresponds to a first quantity of clock cycles and the second value of the timing constraint corresponds to a second quantity of clock cycles.

15. The system of claim 14, wherein the second quantity of clock cycles is less than the first quantity of clock cycles.

16. The system of claim 9, wherein the first clock rate is associated with a first data rate and the second clock rate is associated with a second data rate, wherein the second data rate is lower than the first data rate.

17. A non-transitory computer-readable medium comprising instructions which, when executed by one or more processors of an electronic device, cause the electronic device to:

read, by a host device, a value of a register comprising serial presence detect (SPD) data of a memory module, the SPD data indicative of a first value of a timing constraint for operating the memory module at a corresponding first clock rate, the first value of the timing constraint and the first clock rate associated with a first speed bin;

select, for communication with the memory module, a second speed bin associated with a second clock rate at the host device and a second value of the timing constraint, wherein the second clock rate is lower than the first clock rate and the second value of the timing constraint is higher than or equal to the first value of the timing constraint; and communicate with the memory module according to the second speed bin.

18. The non-transitory computer-readable medium of claim 17, wherein the instructions, when executed by the one or more processors of the electronic device, further cause the electronic device to:

downclock, at the host device, from a third clock rate to the second clock rate based at least in part on reading the value of the register comprising the SPD data of the memory module, wherein communicating with the memory module according to the second speed bin is based at least in part on the downclocking.

19. The non-transitory computer-readable medium of claim 17, wherein the instructions, when executed by the one or more processors of the electronic device, further cause the electronic device to:

determine the second value of the timing constraint as part of selecting the second speed bin.

20. The non-transitory computer-readable medium of claim 17, wherein the timing constraint corresponds to one or more of a row precharge delay, a row address to column address delay, or an array access delay.

* * * * *